United States Patent
Guo et al.

(10) Patent No.: US 8,508,924 B2
(45) Date of Patent: Aug. 13, 2013

(54) PORTABLE ELECTRONIC DEVICE

(75) Inventors: Jing-Zhen Guo, Shenzhen (CN);
Ren-Xiu Yang, Shenzhen (CN);
Chao-Yuan Cheng, New Taipei (TW)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 199 days.

(21) Appl. No.: 13/229,552

(22) Filed: Sep. 9, 2011

(65) Prior Publication Data
US 2013/0021722 A1    Jan. 24, 2013

(30) Foreign Application Priority Data
Jul. 21, 2011   (CN) .......................... 2011 1 0205097

(51) Int. Cl.
*G06F 1/16*   (2006.01)

(52) U.S. Cl.
USPC ............... 361/679.09; 312/223.1; 267/140.2; 248/214; 345/659

(58) Field of Classification Search
USPC ............... 312/325, 223.1, 223.2; 267/141.2, 267/220, 135, 140.2; 439/157, 733.1, 142, 439/441, 35; 248/206.2, 278.1, 279.1, 157, 248/550, 214; 16/66, 54, 382, 386; 361/679.55, 679.01, 679.31, 679.58, 679.27, 361/679.35, 679.56, 679.33, 679.43, 679.29, 361/679.26, 679.54, 679.28, 679.41; 345/650, 345/160, 168, 173, 156, 531, 169, 659
See application file for complete search history.

(56) References Cited

U.S. PATENT DOCUMENTS

| | | | |
|---|---|---|---|
| 2009/0147469 A1* | 6/2009 | Chen et al. | 361/679.55 |
| 2009/0178605 A1* | 7/2009 | Tufte | 114/361 |
| 2011/0221319 A1* | 9/2011 | Law et al. | 312/325 |

* cited by examiner

*Primary Examiner* — Hung Duong
(74) *Attorney, Agent, or Firm* — Altis Law Group, Inc.

(57) ABSTRACT

A portable electronic device includes a first cover, a second cover and a connecting mechanism connecting the first cover with the second cover. The connecting mechanism includes a fixing base fixed on the first cover, a turning base fixed on the second cover, a first linking board rotatably connected to the fixing base and the turning base, a second linking board rotatably connected to the fixing base and the turning base. The fixing base, the first linking board, the turning base and the second linking board collectively form a four-bar linkage mechanism. The connecting mechanism further includes an arc spring urged between the second linking board and the fixing base to supply an elastic force to the four-bar linkage mechanism.

20 Claims, 6 Drawing Sheets

PORTABLE ELECTRONIC DEVICE

BACKGROUND

1. Technical Field

The present disclosure relates to a portable electronic device, and more particularly to a connecting mechanism of the portable electronic device.

2. Description of Related Art

In general, portable electronic devices, such as foldable mobile telephones and notebook computers, for example, comprise a first cover, a second cover and a hinge mechanism connecting the first cover with the second cover. The first cover could be folded to the second cover for convenient carrying purposes, or the first cover could be opened relative to the second cover with a suitable angle for calling or viewing messages or pictures. However, the hinge mechanism has a driving mechanism to make the first cover and the second cover open and close, and the driving mechanism has a complicated structure and a high production cost.

Therefore, a need exists in the industry to improve reliability of the driving mechanism.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
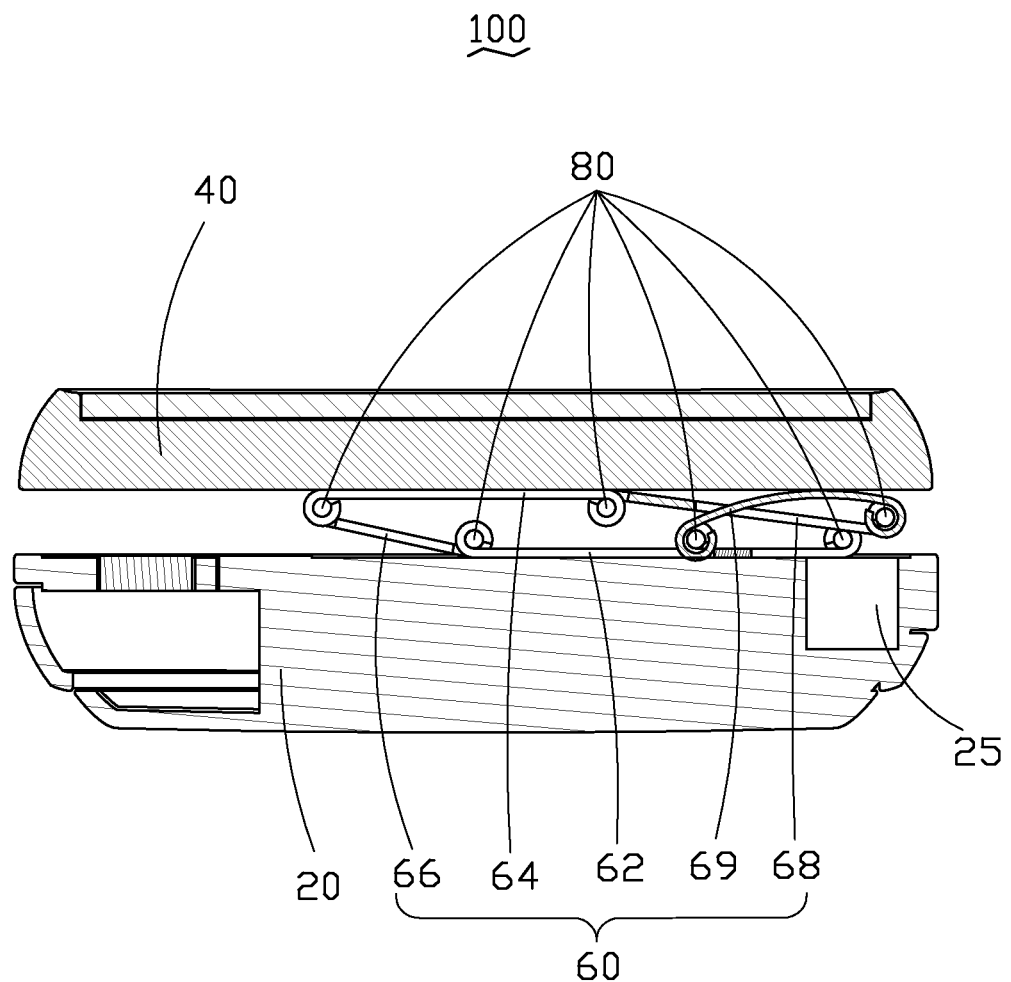
FIG. 1 is a perspective view of one exemplary embodiment of a portable electronic device in a close state in accordance with the present disclosure.

Referring to FIG. 1, a portable electronic 100, such as a mobile telephone, a personal computer, comprises a first cover 20, a second cover 40 and a connecting mechanism 60 connecting the first cover 20 with the second cover 40. The second cover 40 slides and turns relative to the first cover 20 to open the second cover 40 when driven by the connecting mechanism 60 via pushing the second cover 40.

The connecting mechanism 60 comprises a fixing base 62, a turning base 64, a first linking board 66, a second linking board 68 and an arc spring 69. The fixing base 62 is fixed on the first cover 20 and the turning base 64 is fixed on the second cover 40, the first linking board 66 is rotatably connected to the fixing base 62 and the turning base 64, the second linking board 68 is rotatably connected the fixing base 62 to the turning base 64. Therefore, the fixing base 62, the turning base 64, the first linking board 66 and the second linking board 68 are collectively form a four-bar linkage mechanism. The arc spring 69 is urged between the second linking board 68 and the fixing base 62 to supply an elastic force to the four-bar linkage mechanism.

Figure 2:
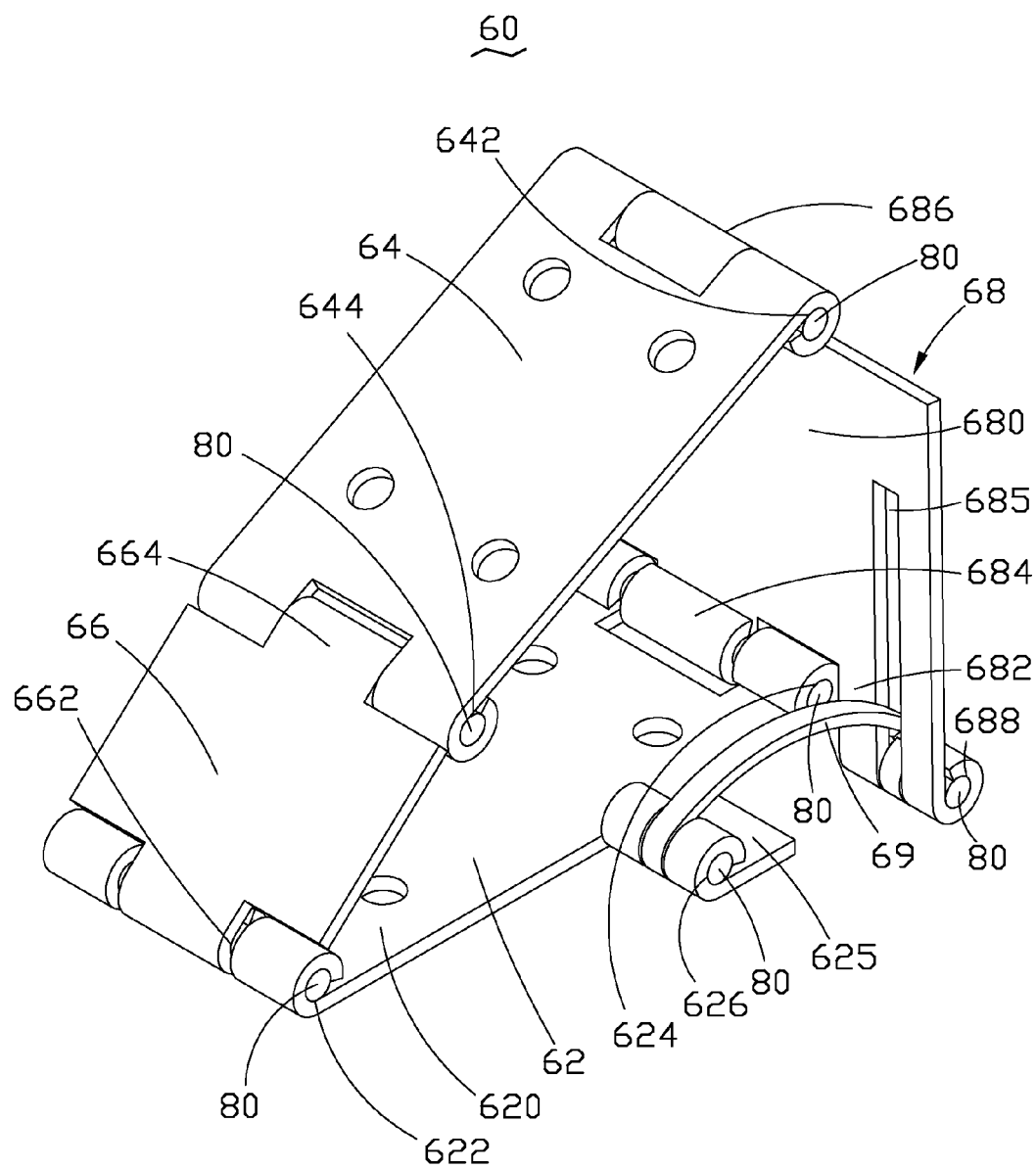
FIG. 2 is a perspective view of one exemplary embodiment of a connecting mechanism of the portable electronic device in an opening state in accordance with the present disclosure.
Figure 3:
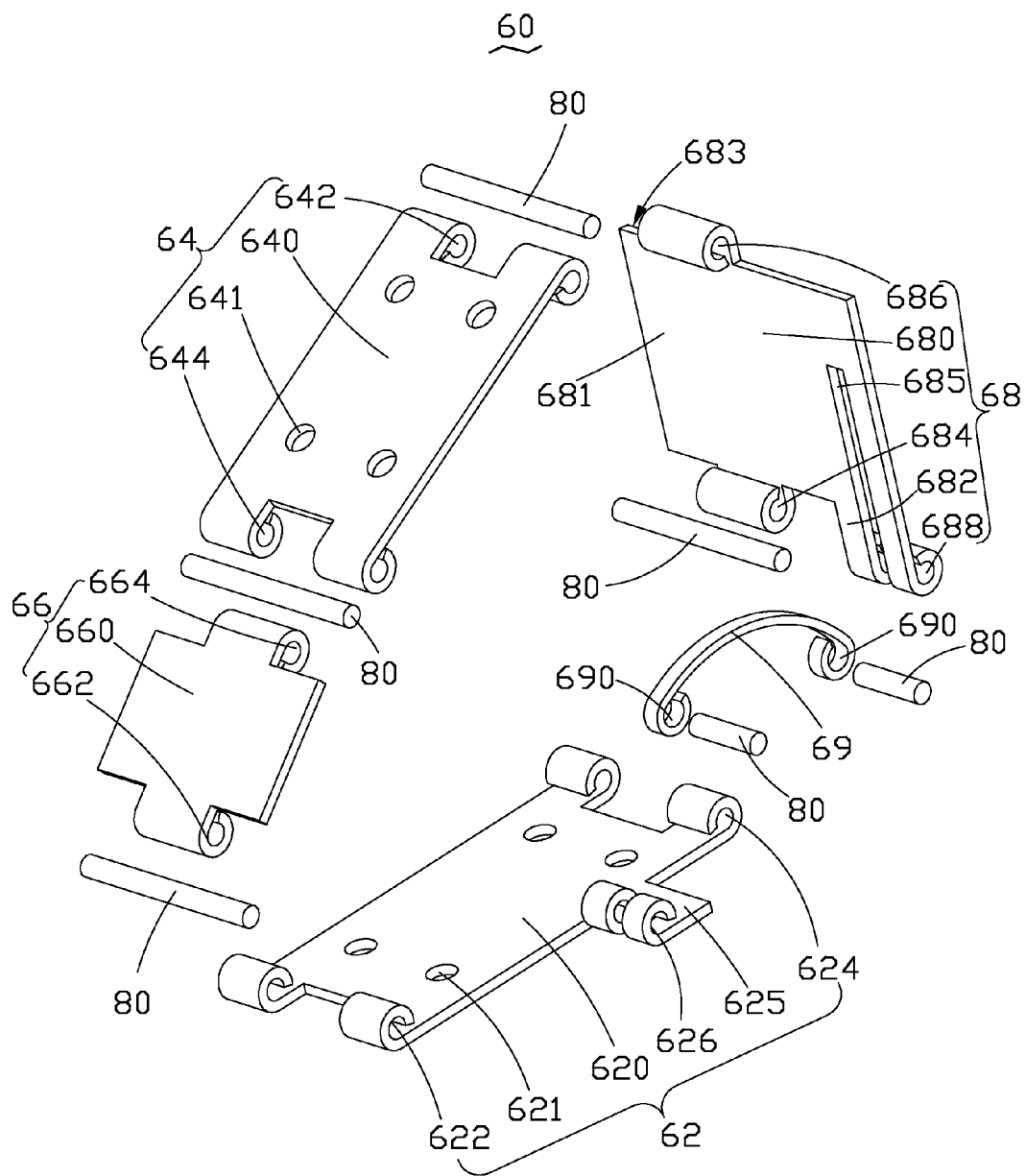
FIG. 3 is a disassembled perspective view of the exemplary embodiment of the connecting mechanism of FIG. 2.

Referring to FIG. 2 and FIG. 3, the fixing base 62 comprises a first fixing base 620 and a first adjusting base 625 coplanar with the first fixing base 620, and defines a first shaft hole 622, a second shaft hole 624 and a third shaft hole 626. The first fixing base 620 is substantially a tabulate plate and defines a plurality of first fixing holes 621. A plurality of fasteners (not shown), such as screws, bolts, for example, pass through the corresponding first fixing holes 621 to securely fix the first fixing base 620 on the first cover 20. The first shaft hole 622 and the second shaft hole 624 are respectively formed by curling two opposite side edges of the first fixing base 620 towards the same side of the first fixing base 620. The adjusting base 625 protrudes from a side edge of the first fixing base 620 and is configured between the first shaft hole 622 and the second shaft hole 624. In the illustrated embodiment, the first fixing base 620 is integrally formed with the first adjusting base 625. The third shaft hole 626 is a curled one edge of the first adjusting base 625 contiguous with the first shaft hole 622, and has the same curling direction with the first shaft hole 622. In the illustrated embodiment, central lines of the first shaft hole 622, the second shaft hole 624 and the third shaft hole 626 are parallel with each other and located on the same plane.

The turning base 64 comprises a second fixing base 640, and defines a fourth shaft hole 642 and a fifth shaft hole 644. The second fixing base 640 is substantially a tabulate plate and defines a plurality of second fixing holes 641. A plurality of fasteners (not shown), such as screws, bolts, for example, pass through the corresponding second fixing hole 641 to securely fix the second fixing base 640 on the second cover 40. The fourth shaft hole 642 and the fifth shaft hole 644 are respectively formed by curling two opposite side edges of the second fixing base 640 towards the same side of the second fixing base 640. In the illustrated embodiment, central lines of the fourth shaft hole 642 and the fifth shaft hole 644 are parallel with each other.

The first linking board 66 comprises a first connecting base 660, and defines a first shaft hole 662 and a fifth shaft hole 664. In the illustrated embodiment, the first connecting base 660 is substantially a tabulate plate. The first shaft hole 662 and the fifth shaft hole 664 are respectively formed by curling two opposite side edges of the first connecting base 660 towards the same side of the first connecting base 660. In the illustrated embodiment, central lines of the first shaft hole 662 and the fifth shaft hole 664 are parallel with each other. The first shaft hole 662 and the first shaft hole 622 of the fixing base 62 collectively form a combining shaft hole into which a pin roll 80 is inserted to rotatably connect one end of the first linking board 66 with one end of the first fixing base 620. Similarly, the fifth shaft hole 664 and the fifth shaft hole 644 of the turning base 64 collectively form a combining shaft hole, into which a pin roll 80 is inserted to rotatably connect the other end of the first linking board 66 with one end of the turning base 64. Therefore, the first linking board 66 rotatably connects one end of the fixing base 62 with one end of the turning base 64.

The second linking board 68 comprises a second connecting base 680 and a second adjusting base 682 coplanar with the second connecting base 680, and defines a second shaft hole 684, a fourth shaft hole 686 and a sixth shaft hole 688. In the illustrated embodiment, the second linking board 68 is substantially a tabulate plate to be formed as an L-shape, and the second connecting base 680 is integrally formed with the second adjusting base 682. The second linking board 68 comprises a first surface 681 and a second surface 683 opposite to the first surface 681. The second shaft hole 684 and the fourth shaft hole 686 are respectively formed by curling two opposite side edges of the second connecting base 680 towards the first surface 681. The second adjusting base 682 extends from the end edge of the second connecting base 680 which is contiguous with the second shaft hole 684. The sixth shaft hole 688 is formed by curling one end edge of the second adjusting base 682 away from the second connecting base 680 towards the second surface 683, that is, the curling direction of the second shaft hole 688 is opposite to the second shaft hole 684. In the illustrated embodiment, central lines of the second shaft hole 684, a fourth shaft hole 686 and the sixth shaft hole 688 are parallel with each other. The second shaft hole 684 and the second shaft hole 624 of the fixing base 62 collectively form a combining shaft hole into which a pin roll 80 is inserted to rotatably connect one end of the second connecting base 680 with the other end of the first fixing base 620. Similarly, the fourth shaft hole 686 and the fourth shaft hole 642 of the turning base 64 collectively form a combining shaft hole into which a pin roll 80 is inserted to rotatably connect the other end of the second connecting base 680 with the other end of the turning base 64. Therefore, the fixing base 62, the first linking board 66, the turning base 64 and the second linking board 68 collectively form the four-bar linkage mechanism to improve reliability of the connecting mechanism 60.

In the illustrated embodiment, a distance between the first shaft hole 662 and the fifth shaft hole 664 of the first linking board 66 is shorter than that between the second shaft hole 684 and the fourth shaft hole 686 of the second linking board 68, that is, a length of the first connecting base 660 is shorter than that of the second connecting base 680.

The arc spring 69 defines a pair of coiling holes 690 on two ends of the arc spring 69. The second linking board 68 defines a receiving groove 685 passing through the first surface 681 to the second surface 683 to receive the arc spring 69. The receiving groove 685 extends from the second connecting base 680 towards the second adjusting base 682 and communicates with the sixth shaft hole 688. In the illustrated embodiment, the receiving groove 685 is substantially a strip groove. One of the pair of coiling holes 690 and the third shaft hole 626 collectively form a combining shaft hole into which a pin roll 80 is inserted to connect one end of the arc spring 69 with the end of the first adjusting base 625. Similarly, the other end of the arc spring 69 passes through the receiving groove 685 and the other of the pair of coiling holes 690 and the sixth shaft hole 688 collectively form a combining shaft hole into which a pin roll 80 is inserted to connect the other end of the arc spring 69 with the end of the second adjusting base 682. Therefore, the arc spring 69 elastically connecting the second linking board 68 with the fixing base 62. The second linking board 68 rotates around the pin roll 80 in the second shaft hole 684 under the function of the arc spring 69. That is, the second linking board 68 rotates relative to the fixing base 62 to drive the turning base 64 and the second cover 40 turning, so as to open and close the second cover 40.

Figure 4:
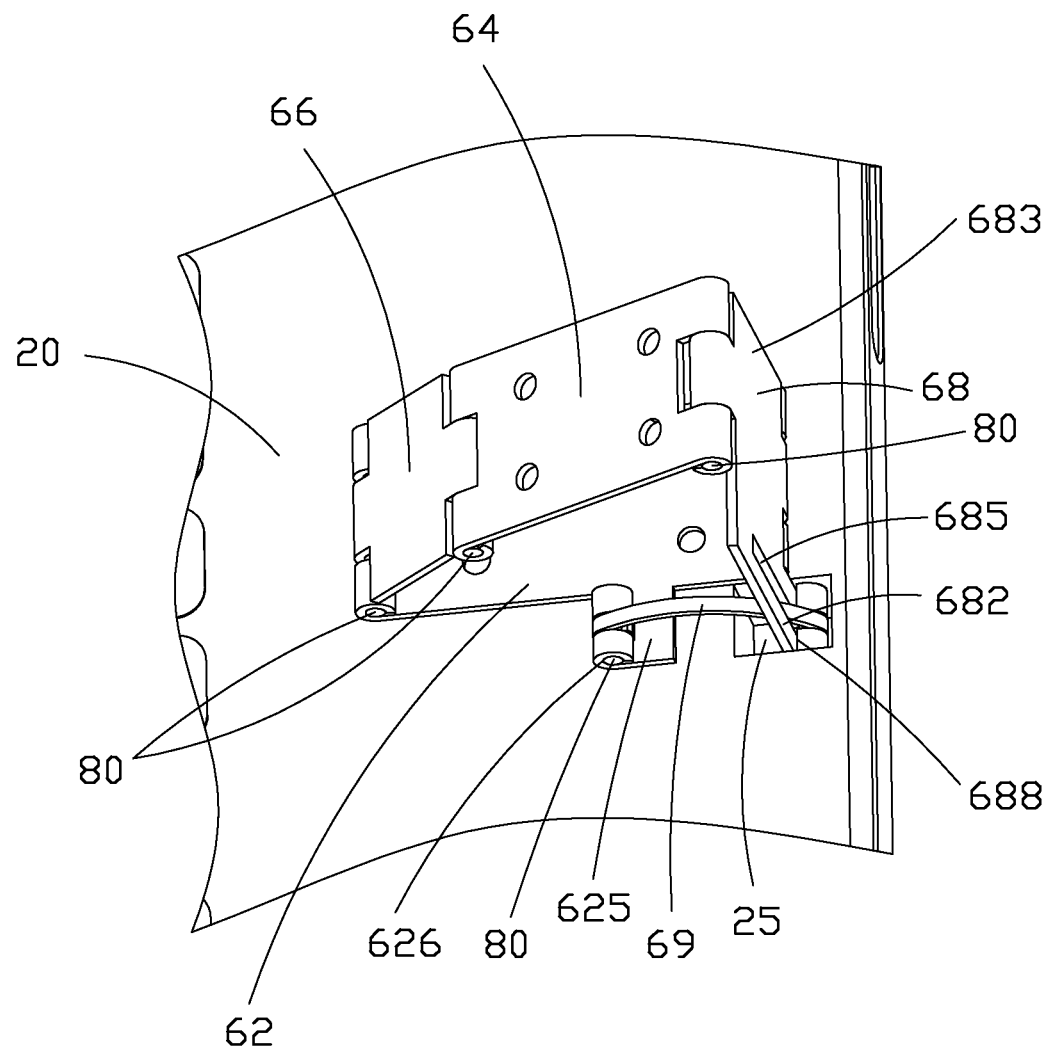
FIG. 4 is a perspective view of the exemplary embodiment of the connecting mechanism mounted on a first cover in accordance with the present disclosure.

Referring to FIG. 4, the first cover 20 defines a receiving recess 25 contiguous with one end of the first cover 20. In assembly, the second shaft hole 624 is close to one edge of the receiving recess 25 and the first adjusting base 625 is contiguous with the receiving recess 25 to securely fix the fixing base 62 on the first cover 20. The turning base 64 is securely fixed on the second cover 40, and the fixing base 62, the first linking board 66, the turning base 64 and the second linking board 68 are connected one by one via the pin rolls 80 to collectively form the four-bar linkage mechanism. The second adjusting base 682 is configured above the receiving recess 25 and can be received in the receiving recess 25 under the function of the arc spring 69. The arc spring 69 elastically connects the first adjusting base 625 with the second adjusting base 682 by passing through the receiving groove 685, and can be partially received in the receiving recess 25.

The second cover 40 is close to the first cove 20 as shown in FIG. 1. In this state, the turning base 64 is parallel with the fixing base 62, an angle between the second linking board 68 and the fixing base 62 is minimum and the arc spring 69 is compressed with one end above the receiving recess 25.

Figure 5:
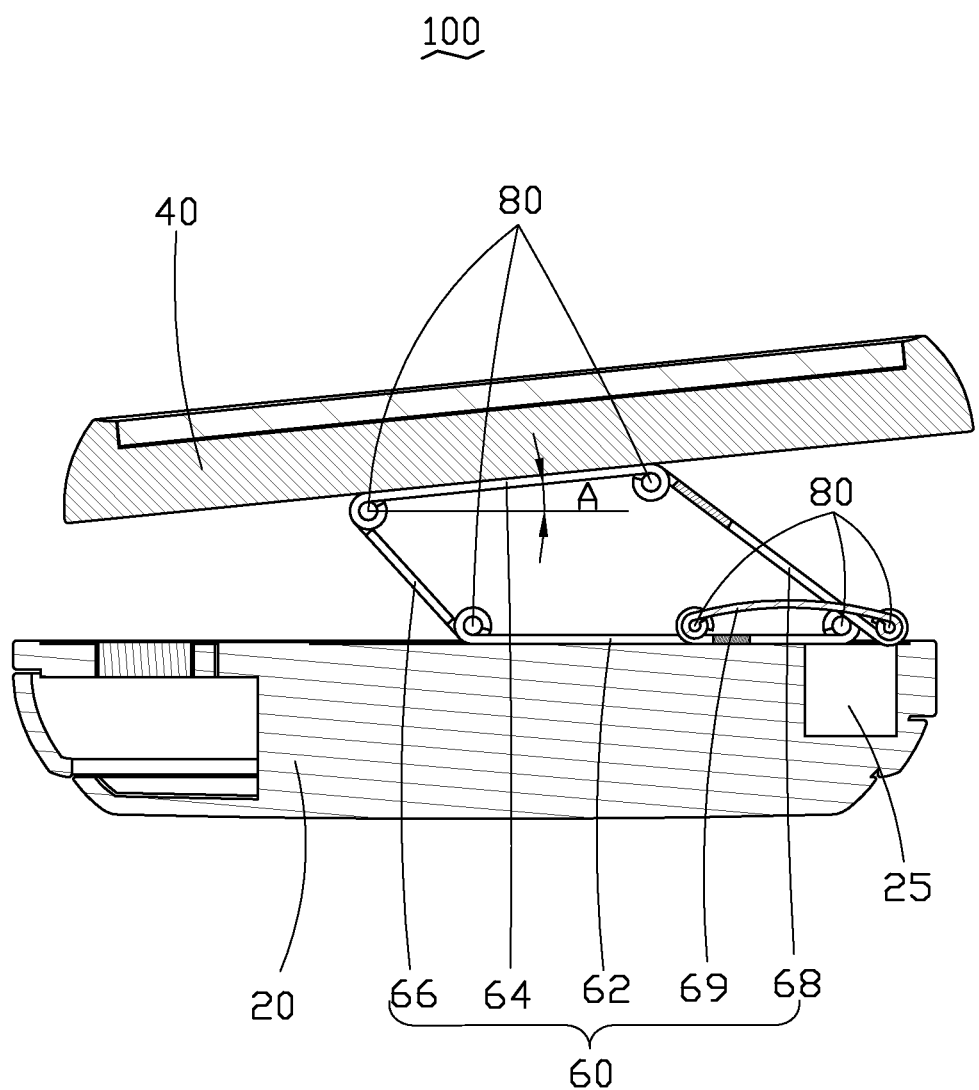
FIG. 5 is a perspective view of the exemplary embodiment of the portable electronic device in a pre-opening state in accordance with the present disclosure.

Referring to FIG. 5, when the portable electronic device 100 is in the close state as shown in FIG. 1, the second cover 40 is pushed to form a certain angle with the first cover 20 for using. The second cover 40 drives and turns with the turning base 64 when the second cover 40 is forced, drives the first linking board 66 and the second linking board 68 rotating in clockwise relative to the fixing base 62, and drives the joint end of the arc spring 69 and the second adjusting base 682 moves towards the receiving recess 25. In the rotating process, the arc spring 68 is stretched. When the second cover 40 is opened to a pre-opening angle A relative to the first cover 20, the arc spring 69 is stretched to maximum deformation, and central lines of the first shaft hole 622, the third shaft hole 626 and the sixth shaft hole 688 are parallel with each other and coplanar. The pre-opening angle A is defined as the angle between the turning base 64 and the fixing base 62.

Figure 6:
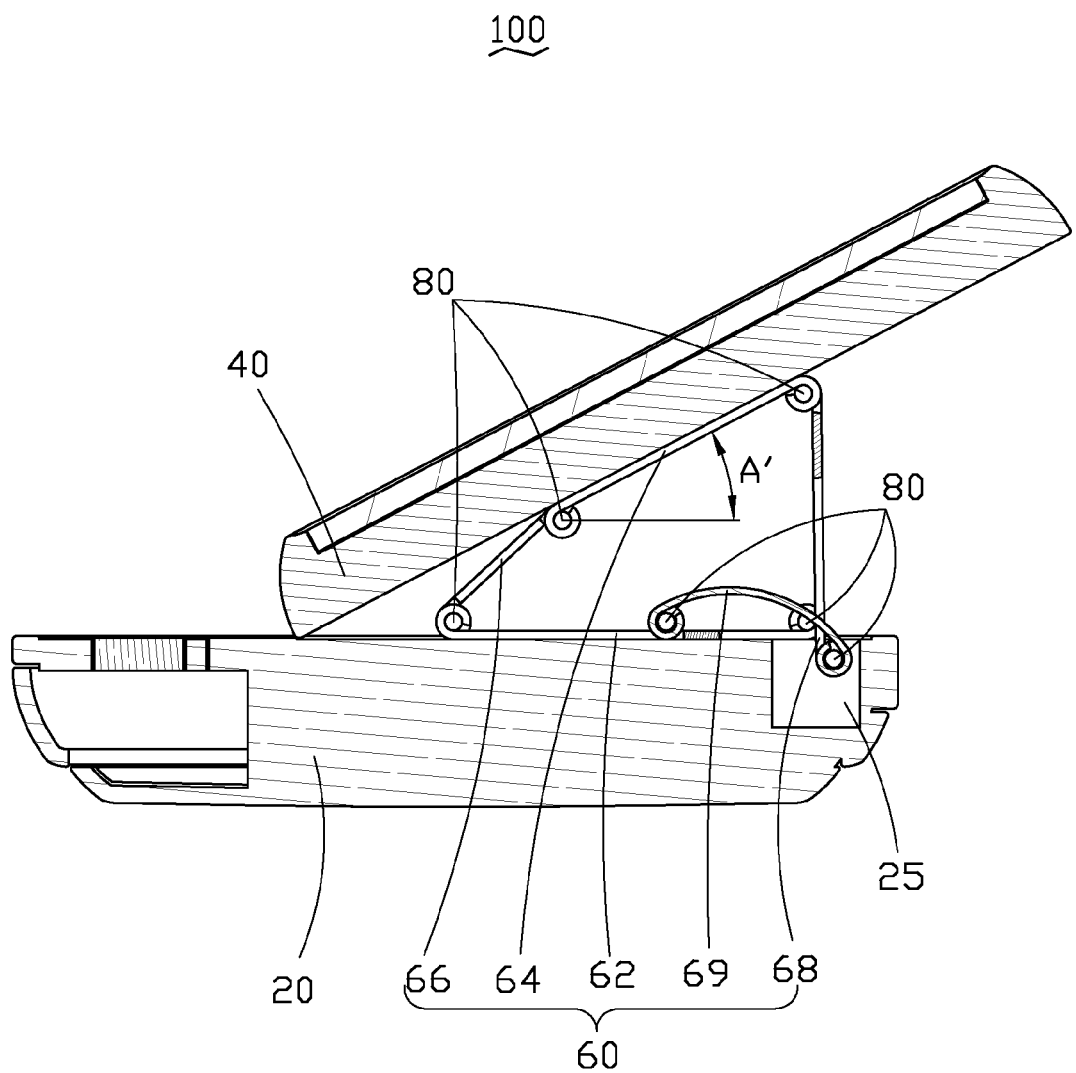
FIG. 6 is a perspective view of the exemplary embodiment of the portable electronic device in the opening state in accordance with the present disclosure.

Referring to FIG. 6, when the angle between the second cover 40 and the first cover 20 is more than the pre-opening angle A, the arc spring 69 is compressed to drive the first linking board 66 and the second linking board 68 continually rotating in clockwise, and the joint end of the arc spring 69 and the second adjusting board 682 movers towards the receiving recess 25. The second cover 40 is completely opened until the second cover 40 turns to open angle A'. At this time, the arc spring 69 is in a minimum stretching deformation state. In the illustrated embodiment, the value of the opening angle A' is greater than that of the pre-opening angel A.

In the illustrated embodiment, the fixing base 62, the first linking board 66, the turning base 64 and the second linking board 68 are connected end-to-end, and the arc spring 69 connects between the fixing base 62 and the second linking board 68 to supply elastic force to the connecting mechanism 60, so as to open or close the second cover 40.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A portable electronic device, comprising a first cover, a second cover and a connecting mechanism connecting the first cover with the second cover, the connecting mechanism comprising:
 a fixing base, fixed on the first cover;
 a turning base, fixed on the second cover;
 a first linking board, rotatably connected to the fixing base and the turning base;
 a second linking board, rotatably connected to the fixing base and the turning base, and collectively forming a four-bar linkage mechanism with the fixing base, the first linking board and the turning base; and
 an arc spring, urged between the second linking board and the fixing base, to supply an elastic force to the four-bar linkage mechanism to open or close the second cover.

2. The portable electronic device as claimed in claim 1, wherein the fixing base comprises a first fixing base fixed on the first cover, and defines a first shaft hole and a second shaft hole at two opposite side edges of the first fixing base, the first linking board defines a first shaft hole and a fifth shaft hole at two opposite side edges of the first linking board, a pin roll is inserted into the first shaft hole of the first fixing base and the first shaft hole of the first linking board to rotatably connect one end of the first linking board with one end of the first fixing base.

3. The portable electronic device as claimed in claim 2, wherein the turning base defines a fourth shaft hole and a fifth shaft hole at two opposite side edges of the turning base, a pin roll is inserted into the fifth shaft hole of the turning base and the fifth shaft hole of the first linking board to rotatably connect the other end of the first linking board with one end of the turning base.

4. The portable electronic device as claimed in claim 3, wherein the second linking board comprises a second connecting base, and defines a second shaft hole and a fourth shaft hole at two opposite side edges of the second connecting base, a pin roll is inserted into the second shaft hole of the first fixing base and the second shaft hole of the second connecting base to rotatably connecting the other end of the first fixing base with one end of the second connecting base, a pin roll is inserted into the fourth shaft hole of the turning base and the fourth shaft hole of the second connecting base to rotatably connecting the other end of the turning base with the other end of the second connecting base.

5. The portable electronic device as claimed in claim 4, wherein a distance between the first shaft hole and the fifth shaft hole of the first linking board is shorter than that between the second shaft hole and the fourth shaft hole of the second linking board.

6. The portable electronic device as claimed in claim 4, wherein the fixing base further comprises a first adjusting base protruding outwardly from the first fixing base, the first adjusting base is configured between the first shaft hole and the second shaft hole of the first fixing base, and defines a third shaft hole engaging with the arc spring to connect the arc spring with the fixing base.

7. The portable electronic device as claimed in claim 6, wherein central lines of the first shaft hole, the second shaft hole and the third shaft hole of the fixing base are in parallel with each other and in a same plane.

8. The portable electronic device as claimed in claim 6, wherein the first fixing base is integrally formed with the first adjust base.

9. The portable electronic device as claimed in claim 6, wherein the second linking board further comprises a second adjusting base extending from the second connecting base, the second adjusting base defines a sixth shaft hole at an end edge of the second adjusting base away from the second connecting base, the sixth shaft hole engages with the arc spring to connect the arc spring with the second linking board.

10. The portable electronic device as claimed in claim 9, wherein the second linking board further defines a receiving groove to receive the arc spring, the receiving groove extends from the second connecting base towards the second adjusting base and communicates with the sixth shaft hole, one end of the arc spring passes through the receiving groove to engage with the sixth shaft hole.

11. The portable electronic device as claimed in claim 9, wherein central lines of the second shaft hole, the fourth shaft hole and the sixth shaft hole of the second linking board are parallel with each other.

12. The portable electronic device as claimed in claim 9, wherein the second connecting base is integrally formed with the second adjusting base.

13. The portable electronic device as claimed in claim 9, wherein the second linking board is substantially a tabulate plat to be form as an L-shape.

14. The portable electronic device as claimed in claim 6, wherein the first cover defines a receiving recess contiguous with the first adjusting base and the arc spring, in a close state, the turning base is in parallel with the fixing base, and the arc spring is compressed with one end above the receiving recess.

15. The portable electronic device as claimed in claim 14, wherein in a pre-opening state, the first linking board and the second linking board rotate relative to the fixing base, the arc spring is stretched to maximum deformation, and the end of the arc spring moves towards the receiving recess.

16. The portable electronic device as claimed in claim 14, wherein central lines of the first shaft hole, the third shaft hole and the sixth shaft hole are in parallel with each other in a same plane.

17. The portable electronic device as claimed in claim 14, wherein in an opening state, the arc spring drives the first linking board and the second linking board rotate relative to the fixing base by stretching deformation, and the end of the arc spring is received in the receiving recess.

18. A portable electronic device, comprising a first cover, a second cover and a connecting mechanism connecting the first cover with the second cover, the connecting mechanism comprising a four-bar linkage mechanism and an arc spring elastically connecting with the four-bar linkage mechanism, the arc spring driving the four-bar linkage mechanism rotating to open and close the second cover on the first cover.

19. The portable electronic device as claimed in claim 18, wherein the four-bar linkage mechanism comprises a fixing base fixed on the first cover, a turning base fixed on the second cover, a first linkage board rotatably connecting the fixing base with the turning base, and a second linking board rotatably connecting the fixing base with the turning base.

20. The portable electronic device as claimed in claim 19, wherein the fixing base comprises a first adjusting base protruding outwardly from edge of the fixing base, the second linking base comprises a second adjusting base extending from the second linking base, the arc spring elastically connects the first adjusting base with the second adjusting base to drive the first linking board, the turning base and the second linking board rotating relative to the fixing base.

* * * * *